March 25, 1952 R. F. QUAM 2,590,206
VESSEL FILLING VALVE
Filed Aug. 2, 1948
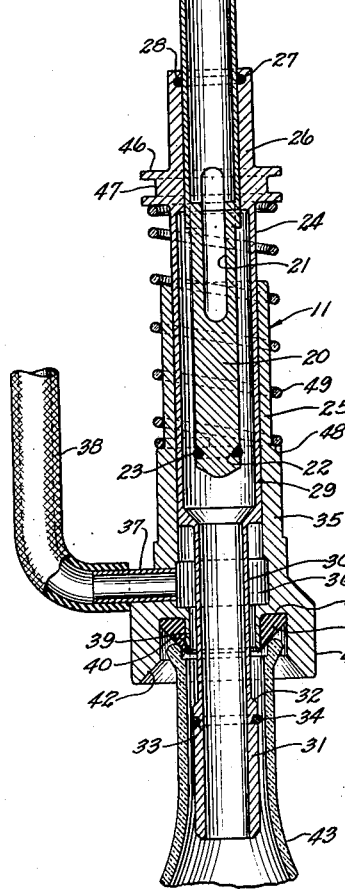
INVENTOR.
Ranold F. Quam
BY
Morsell & Morsell
ATTORNEYS.

Patented Mar. 25, 1952

2,590,206

UNITED STATES PATENT OFFICE 2,590,206

VESSEL FILLING VALVE

Ranold F. Quam, Milwaukee, Wis.

Application August 2, 1948, Serial No. 41,995

12 Claims. (Cl. 226—93)

This invention relates to improvements in vessel filling valves.

In filling vessels such as bottles or the like with certain liquids such as milk, the tendency of said liquids to foam seriously hampers the filling operation when conventional filling valves are used. This foaming necessitates the slowing down of the filling operation to a rate at which a minimum amount of foam is produced in the vessel during the filling thereof. This slowing down of the filling rate necessarily results in low efficiency.

It is a general object of the invention to provide a valve for rapidly filling vessels with a liquid, the filling operation, when said valve is used, being substantially unaffected by the formation of foam from said liquid.

It is a further object of the invention to provide a vessel filling valve which provides for the introduction of a centrally located stream of liquid flowing at high velocity into the vessel and which also provides vent means for egress of air and foam out of the top of the vessel around said central stream of liquid.

A further object of the invention is to provide a valve of the type described which operates by being lowered into sealing engagement with the upper end of the vessel to be filled, rather than by having said vessel raised into operative relation therewith.

A further object of the invention is to provide a valve of the class described which may be quickly and easily disassembled and cleaned, and which is well adapted for use in the food industry.

A further object of the invention is to provide a vessel filling valve which is strong and durable, which is fast and positive in its operation, and which is easy to manufacture and repair.

With these and other object in view, the invention consists of the improved vessel filling valve, and all of its parts and combinations, as set forth in the claims, and all equivalents thereof.

In the drawing accompanying and forming a part of this specification, wherein is shown one complete embodiment of the preferred form of the invention and wherein the same reference numerals indicate the same parts in all the views;

Fig. 1 is a vertical sectional view of the improved valve showing it lowered into filling position relative to a vessel;

Fig. 2 is a vertical sectional view of the improved valve similar to Fig. 1, showing the valve raised into shut-off position;

Fig. 3 is a horizontal sectional view taken along the line 3—3 of Fig. 2;

Fig. 4 is a view taken along the line 4—4 of Fig. 3; and

Fig. 5 is an enlarged fragmentary sectional detail view of the lower seal.

Referring more particularly to the drawing, the numeral 10 indicates the bottom of a tank or other receptacle which is adapted to supply the liquid for the vessels to be filled, and the numeral 11 indicates the improved vessel filling valve. The improved valve 11 comprises an elongated tubular member 12 which may be of any suitable length and which may be formed at its upper end with a threaded shoulder 13. The receptacle 10 is preferably formed with an aperture 14 in the bottom thereof, through which shoulder 13 extends and around the margin of which said bottom is formed with a downwardly sloping annular portion 19. The shoulder 13 is formed with an angularly outwardly and upwardly projecting flange 15, the underside of which rests on the upper surface of the annular sloping portion 19 surrounding the margin of the aperture 14. The tubular member 12 may have a portion of increased internal diameter 16 inwardly of the shoulder 13. An annular collar 17 is preferably threaded on the shoulder 13, and an annular gasket 18, of rubber or other suitable material, surrounds the shoulder 13 and is interposed between the collar 17 and the under side of the portion 19. The collar 17 is sufficiently tightened on the shoulder 13 to prevent leakage past the gasket 18.

A substantially cylindrical stem 20 having an outside diameter equal to the inside diameter of the tube 12 has one end thereof inserted into the lower end of the tube 12 and is fixed thereto. The lower end of the tube 12 and the upper end of the stem 20 are formed with an elongated slot 21 which extends diametrically therethrough, as shown in Figs. 1 and 2. At its lower end the stem 20 is formed with a circumferential groove 22 in which is seated an annular sealing ring 23.

Axially slidable on the tube 12 is an upper sleeve 24, and slidable on the lower end of the upper sleeve 24 is a lower sleeve 25. Adjacent its upper end the sleeve 24 has a portion 26 with a bore diameter substantially equal to the outer diameter of the tube 12. At the upper end of the portion 26 the sleeve 24 is formed with an annular groove 27 in the bore thereof, in which is seated an annular sealing ring 28. Below the portion 26 the sleeve 24 is formed with a portion 29 which has a bore diameter substantially larger than the bore of the portion 26. Below the portion 29 the sleeve 24 is formed with a portion 30 having a bore diameter substantially equal to the diameter of the stem 20 and having an outside diameter approximately the same as that of the tube 12. The lower end of the portion 30 communicates with a portion 31 having an increased wall thickness which forms a shoulder 32 at the upper end thereof. The portion 31 is formed with an external circumferential groove 33 in which is seated an annular sealing ring 34.

The lower sleeve 25 has a portion 35 which has an axial bore of substantially the same diameter as the outer diameter of the portion 29 of the sleeve 24. Below the portion 35 the sleeve 25 is formed with a chamber 36 of enlarged diameter. A conduit 37 preferably projects through the wall of the sleeve 25 and communicates with the interior of the chamber 36. A flexible tube 38 is connected to the outer end of the tube 37 and communicates by suitable connections (not shown) with any suitable receptacle or with the receptacle 10 at a point above the level of the fluid therein. Below the chamber 36, the sleeve 25 is formed with a portion 39 having a bore diameter substantially equal to the outer diameter of the portion 31 of the upper sleeve 24. The lower end of the portion 39 terminates in an outwardly bevelled surface 40. Projecting outwardly and downwardly from the sleeve 25 adjacent the lower end of the chamber 36 is a cup shaped flange 41 which has an annular bevelled surface 42 at its lower end. The flange 41 has an inner diameter substantially larger than the outer diameter of the mouth of the vessel 43 to be filled. An annular sealing ring 44, having a substantially triangular cross-sectional shape, is seated in the annular recess 45 formed by the cup-shaped flange 41 in the manner shown in Figs. 1 and 2.

The sleeve 24 near its upper end is formed with an external annular shoulder 46 which is formed with a circumferential groove 47. The groove 47 is for the purpose of providing a means for the connection of an actuating yoke or lever (not shown) which may telescopically reciprocate the sleeve 24 on the tube 12 for a purpose to be described hereinafter. The sleeve 25 is formed with an external annular shoulder 48, and a helical compression spring 49 is positioned around the sleeves 24 and 25, with its ends abutting the shoulders 46 and 48 of said sleeves as shown in Figs. 1 and 2.

In operation, the improved valve, when in raised or shut-off position, is disposed as shown in Fig. 2. When the parts of the improved valve are so arranged, the stem 20 with its sealing ring 22 is positioned in the bore of the portion 30 of the sleeve 24. This seals off the tube 12 and prevents any liquid from passing down through said tube and out through the lower end of the sleeve 24. At the same time, the compression spring 49, by pressing axially against the shoulders 46 and 48, forces the sealing ring 34, which is on the lower end of the sleeve 24, against the bevelled surface 40 on the lower end of the sleeve 25 (see Fig. 5), thereby sealing off the lower end of the sleeve 25. The annular sealing ring is of such a size that it will not compress sufficiently to pass into the bore of the portion 39 of the sleeve 25.

When it is desired to fill a vessel, such as the bottle 43, with fluid from the tank 10, the bottle is placed below the lower end of the sleeve 24 in coaxial relationship therewith. The actuating lever (not shown) is then operated in a manner to force the sleeve 24 downwardly along the tube 12 to the position shown in Fig. 1. This places the lower end portions 30 and 31 of the sleeve 24 in the neck of the bottle 43. It will be noted that the neck of the bottle 43 is of substantially larger internal diameter than the outer diameter portion 31 of the sleeve 24 therein. Movement of the sleeve 24 downwardly causes the spring 49 to push the sleeve 25 downwardly therewith in an attempt to maintain the relative relationship between the two sleeves the same as that shown in Fig. 2. This relationship is maintained during downward movement of the sleeve 24 until the sealing ring 44 sealingly engages the mouth of the bottle 43 as shown in Fig. 1. The downward movement of the sleeve 25 is thereby stopped, and further downward movement of the sleeve 24 brings about relative movement of the sleeves to the positions shown in Fig. 1. The spring 49 is compressed during this relative movement.

It will be noted that in Fig. 1 the stem 20 is no longer positioned in the bore of the portion 30 and that the lower end of the sleeve 24 is no longer sealed off by the sealing ring 34. Fluid will therefore pass down through the tube 12 through the slot 21, through the bore of the portions 29 and 30 into the bottle 43. The fluid will be directed to the bottom of the bottle 43 in a solid fast moving stream. As fluid so enters the bottle 43, the air in the bottle, as well as any foam created by the fluid, will pass upwardly around the portion 31 of the sleeve 24 and through the bore of the portion 39 at the lower end of the sleeve 25, through the chamber 36, through the tube 37 and vent out through the tube 38 to a suitable receptacle, or back into the tank 10.

After the bottle 43 has been filled with liquid, the actuating lever is operated to raise the sleeve 24. This withdraws the lower end of the sleeve 24 from the bottle. As this is done, the spring 49 keeps the sealing ring 44 in sealing engagement with the mouth of the bottle 43 until the sealing ring 34 moves up into sealing engagement with the bevelled surface 40. Further upward movement of the sleeve 24 causes simultaneous upward movement of the sleeve 25 therewith due to the engagement of the ring 34 with the surface 40. Substantially simultaneously with the sealing off of the lower end of the sleeve 25 by the sealing ring 34, the bore of the portion 30 of the sleeve 24 is sealed off by being moved upwardly to telescopically engage the stem 20 and its sealing ring 23. All flow of fluid, foam, and air through the valve is thereby stopped. Further upward movement of the sleeve 24 moves the sleeve 25 upwardly therewith to permit removal of the filled bottle 43 from its position therebelow.

It will be noted that the improved valve delivers a large volume of liquid in a centrally located stream to the bottom of the vessel being filled, and that the liquid then rises in the bottle around the entering stream, driving the air and the foam out of the top to be carried away through the tube 38. Due to the fact that the entering liquid is in the form of a solid stream flowing at high velocity, the tendency of the fluid to foam is reduced and large bubbles are produced which are easily eliminated.

The improved valve does not require the raising and lowering of a vessel before and after it is filled as was required by filling valves used heretofore. By reason of its novel construction, the improved valve is fast and positive in operation. It is easily disassembled and cleaned, and is well adapted for use in the food industries.

Various changes and modifications can be made without departing from the spirit of the invention, and all of such changes are contemplated as may come within the scope of the claims.

What I claim is:

1. A vessel filling valve comprising a liquid inlet conduit, a first sleeve member telescopically slidable on said conduit, said sleeve having an end portion insertable into a vessel to be filled, a second sleeve telescopically slidable on said first mentioned sleeve, said second sleeve having a vessel-mouth-sealing portion and also having a vent, there being an annular space between said sleeves adjacent said mouth-sealing-means, said annular space communicating with said vent and with the vessel engaging side of said mouth-sealing-means when the sleeves are in one position of telescopic movement, means responsive to telescopic movement of said first sleeve in one direction on said inlet conduit for selectively preventing the flow of fluid through said first sleeve, and means on said first sleeve for selectively sealing off the annular space between said first and second sleeves.

2. A vessel filling valve comprising a liquid inlet conduit, a first sleeve member telescopically slidable on said conduit, said sleeve having an end portion insertable into a vessel to be filled, a second sleeve telescopically slidable on said first mentioned sleeve, said second sleeve having a vessel-mouth-sealing portion and also having a vent, there being an annular space between said sleeves adjacent said mouth-sealing means, said annular space communicating with said vent and with the vessel engaging side of said mouth-sealing means when said sleeves are in one position of telescopic movement, means responsive to telescopic movement of said first sleeve in one direction on said inlet conduit for selectively preventing the flow of fluid through said first sleeve, means on said first sleeve for sealing off the annular space between said first and second sleeves, and spring means acting against said first and second sleeves for normally maintaining said annular space in sealed-off condition.

3. A vessel filling valve comprising a liquid inlet conduit, a first sleeve member telescopically slidable on said conduit, said sleeve having an end portion insertable into a vessel to be filled, a second sleeve telescopically slidable on said first mentioned sleeve, said second sleeve having a vessel-mouth-sealing portion and also having a vent, there being an annular space between said sleeves adjacent said mouth sealing means, said annular space communicating with said vent and with the vessel engaging side of said mouth-sealing means when said sleeves are in one position of telescopic movement, a stem carried by said inlet conduit and positioned to selectively prevent the flow of fluid through said first sleeve when said first sleeve is telescopically moved on said inlet conduit, and means on said first sleeve for selectively sealing off the annular space between said first and second sleeves.

4. A vessel filling valve comprising a liquid inlet conduit, a first sleeve member telescopically slidable on said conduit, said sleeve having an external shoulder and having an end portion insertable into a vessel to be filled, a second sleeve telescopically slidable on said first mentioned sleeve and also having an external shoulder, said second sleeve having a vessel-mouth-sealing portion and also having a vent, there being an annular space between said sleeves adjacent said mouth-sealing means, said annular space communicating with said vent and with the vessel engaging side of said mouth-sealing means when said sleeves are in one position of telescopic movement, a stem carried by said inlet conduit and positioned to selectively prevent the flow of fluid through said first sleeve, when said first sleeve is telescopically moved on said inlet conduit, means on said first sleeve for sealing off the annular space between said first and second sleeves, and a spring engaging the shoulders of said first and second sleeves for urging said sleeves in opposite directions to normally maintain said annular space in sealed-off condition.

5. A vessel filling valve comprising a liquid inlet conduit, a first sleeve member telescopically slidable on said conduit, said sleeve having an external shoulder and having an end portion of reduced diameter insertable into a vessel to be filled, a second sleeve telescopically slidable on said first mentioned sleeve, and also having an external shoulder, said second sleeve having a vessel-mouth-sealing portion and also having a vent, there being an annular space between said sleeves adjacent the portion of reduced diameter on said first sleeve, said annular space communicating with said vent and with the vessel engaging side of said mouth-sealing means when said sleeves are in one position of telescopic movement, a stem carried by said inlet conduit and selectively sealingly insertable into the portion of reduced diameter of said first sleeve when said first sleeve is moved in one direction on said inlet conduit for preventing the flow of fluid through said first sleeve, means on said first sleeve for sealing off the annular space between said first and second sleeves, and a spring engaging the shoulders of said first and second sleeves for urging said sleeves in opposite directions to normally maintain said annular space in sealed-off condition.

6. A vessel filling valve comprising a liquid inlet conduit, a first sleeve member telescopically slidable on said conduit, said sleeve having an external shoulder and having an end portion of reduced diameter insertable into a vessel to be filled, a second sleeve telescopically slidable on said first mentioned sleeve and also having an external shoulder, said second sleeve being formed with a vent and with a cup shaped flange forming an annular recess, an annular vessel-mouth-sealing ring positioned in said recess, there being an annular space between said sleeves adjacent said cup-shaped flange, said annular space communicating with said vent and with the vessel engaging side of said vessel-mouth-sealing ring when said sleeves are in one position of telescopic movement, a stem carried by said inlet conduit and positioned to selectively prevent the flow of fluid through said first sleeve, means on said first sleeve for sealing off the annular space between said first and second sleeves, and a spring engaging the shoulders of said first and second sleeves for urging said sleeves in opposite directions to normally maintain said annular space in sealed-off condition.

7. A vessel filling valve comprising a liquid inlet conduit, a first sleeve member telescopically slidable on said conduit, said sleeve having an external shoulder and having an end portion of reduced diameter insertable into a vessel to be filled, a second sleeve telescopically slidable on said first mentioned sleeve and also having an external shoulder, said second sleeve being formed with a vent and with a cup-shaped flange forming an annular recess, an annular vessel-mouth-sealing ring positioned in said recess, there being an annular space between said sleeves adjacent said cup-shaped flange, said annular space communicating with said vent and with the vessel engaging side of said vessel-mouth-sealing ring when said sleeves are in one position of telescopic movement, a stem carried by said inlet conduit and selectively sealingly insertable into the portion of reduced diameter of said first sleeve when said first sleeve is moved in one direction on said inlet conduit for preventing the flow of fluid through said first sleeve, means on said first sleeve for sealing off the annular space between said first and second sleeves, and a spring engaging the shoulders of said first and second sleeves for urging said sleeves in opposite directions to normally maintain said annular space in sealed-off condition.

8. A vessel filling valve comprising: a vertically extending liquid inlet conduit formed with an aperture in a sidewall portion thereof adjacent its lower end; a stem fixedly positioned in and closing the lower end of said inlet conduit; a first sleeve member telescopically slidable on said inlet conduit and having a portion of reduced diameter, said stem being operable, upon movement of said sleeve in one direction, to prevent the flow of fluid through said sleeve, and said sleeve having its lower end portion insertable into a vessel to be filled; a second sleeve telescopically associated with said first sleeve and having a vessel mouth seal thereon provided with a vent; and sealing means on the lower end portions of said first and second sleeves cooperable in response to relative movement of said sleeves in one direction to close said vent.

9. A vessel filling valve comprising: a vertically extending liquid inlet conduit formed with an aperture in a side wall portion thereof adjacent its lower end; a sleeve member having an upper end portion telescopically slidable on said inlet conduit and having an intermediate portion adjacent said inlet conduit aperture spaced outwardly from said conduit to form a fluid passage, said sleeve having a lower end portion of reduced diameter projecting below the lower end of said inlet conduit and insertable into a vessel to be filled; a vessel mouth seal on said sleeve provided with a vent; and means closing the lower end of the inlet conduit and adapted to be sealingly inserted into the reduced lower end portion of said sleeve upon movement of said sleeve in one direction to prevent the flow of fluid through said sleeve.

10. A vessel filling valve comprising: a vertically extending liquid inlet conduit formed with an aperture in a side wall portion thereof adjacent its lower end; a sleeve member having an upper end portion telescopically slidable on said inlet conduit and having an intermediate portion adjacent said inlet conduit aperture spaced outwardly from said conduit to form a fluid passage, said sleeve having a lower end portion of reduced diameter projecting below the lower end of said inlet conduit and insertable into a vessel to be filled; a vessel mouth seal on said sleeve provided with a vent; and a stem fixedly positioned in and closing the lower end of the inlet conduit and adapted to be sealingly inserted into the reduced lower end portion of said sleeve upon movement of said sleeve in one direction to prevent the flow of fluid through said sleeve.

11. A vessel filling valve comprising: a vertically extending liquid inlet conduit formed with an aperture in a side wall portion thereof adjacent its lower end; a sleeve member having an upper end portion telescopically slidable on said inlet conduit and having an intermediate portion adjacent said inlet conduit aperture spaced outwardly from said conduit to form a fluid passage, said sleeve having a lower portion of reduced diameter projecting below the lower end of said inlet conduit and insertable into a vessel to be filled; a vessel mouth seal on said sleeve spaced below inlet conduit and provided with a vent positioned to communicate with the interior of a bottle being filled when said sleeve is in one position; a stem fixedly positioned in and closing the lower end of the inlet conduit and adapted to be sealingly inserted into the reduced lower end portion of said sleeve upon movement of said sleeve in one direction to prevent the flow of fluid through said sleeve; and means on said sleeve for preventing communication between said vent and both the interior of the bottle and the inlet conduit whenever the flow of fluid through the sleeve is stopped.

12. A vessel filling valve comprising: a vertically extending liquid inlet conduit formed with an aperture in a side wall portion thereof adjacent its lower end; a sleeve member having an upper end portion telescopically slidable on said inlet conduit and having an intermediate portion adjacent said inlet conduit aperture spaced outwardly from said conduit to form a fluid passage, said sleeve having a lower end portion of reduced diameter projecting below the lower end of said inlet conduit and insertable into a vessel to be filled; means closing the lower end of the inlet conduit and adapted to be sealingly inserted into the reduced lower end portion of said sleeve upon movement of said sleeve in one direction to prevent the flow of fluid through said sleeve; a second sleeve telescopically associated with said first-mentioned sleeve and having a vessel mouth seal thereon provided with a vent; and sealing means on the lower end portions of said first and last-mentioned sleeves cooperable in response to relative movement of said sleeves in one direction to close said vent.

RANOLD F. QUAM.

REFERENCES CITED

The following references are of record in the file of this patent:

UNITED STATES PATENTS

| Number | Name | Date |
|---|---|---|
| 664,629 | Franc et al. | Dec. 25, 1900 |
| 720,562 | Castle | Feb. 17, 1903 |
| 938,577 | Gull | Nov. 2, 1909 |
| 1,216,574 | Kiefer | Feb. 20, 1917 |
| 1,419,235 | Desobey | June 13, 1922 |